Patented Sept. 12, 1950

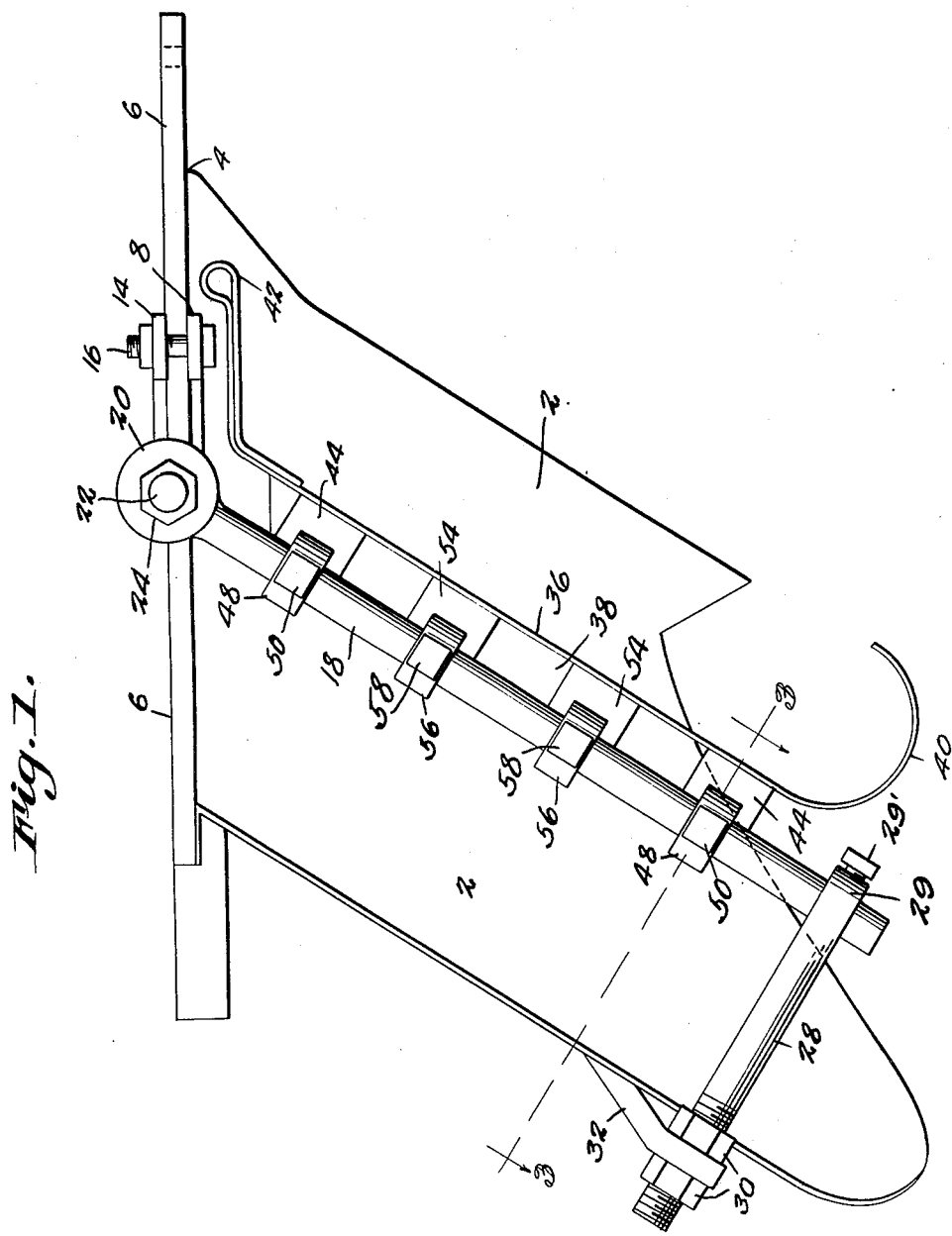

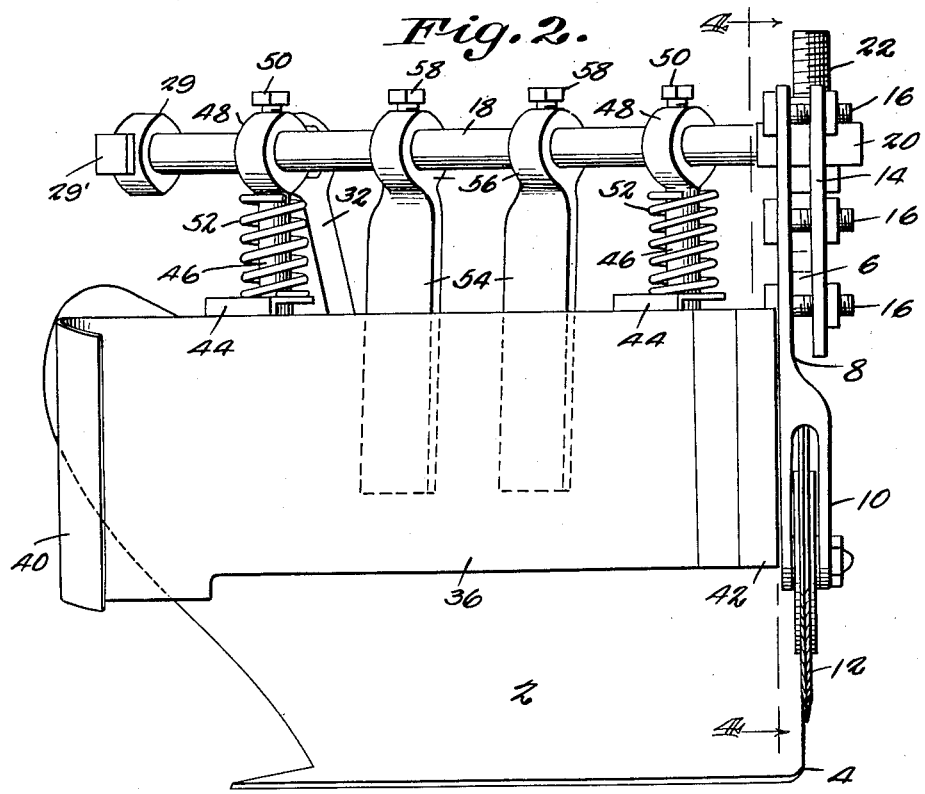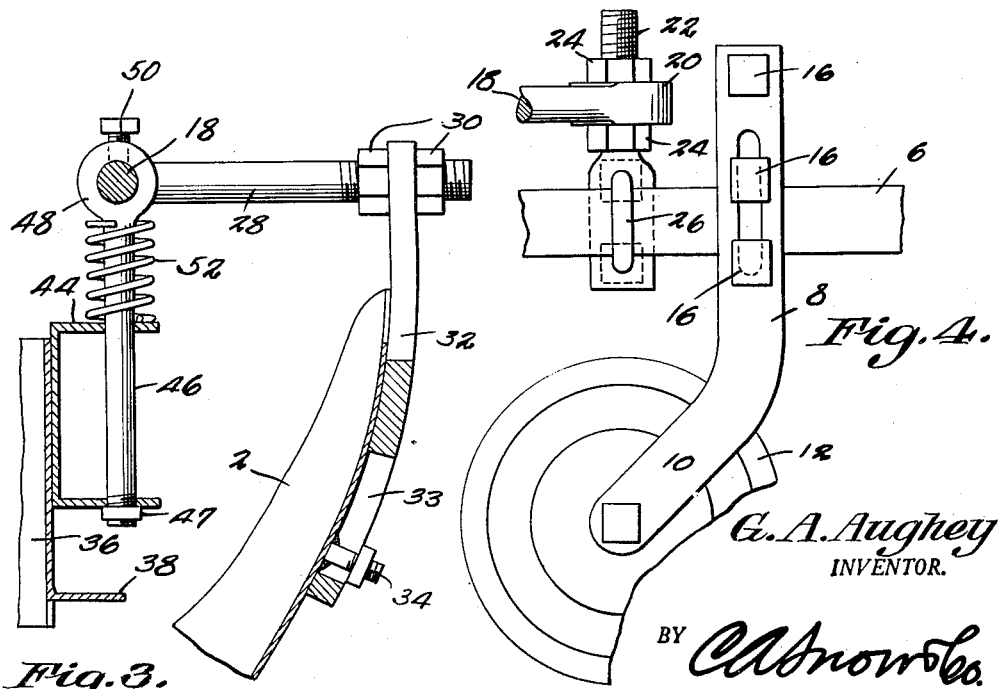

2,521,681

UNITED STATES PATENT OFFICE 2,521,681

WEED AND STUBBLE TURNER

George A. Aughey, Lime, Oreg.

Application June 28, 1946, Serial No. 680,240

2 Claims. (Cl. 97—193)

My present invention relates to an improved weed and stubble turner of the type especially adapted for use on and with the conventional mold board plow for the particular purpose of turning into the furrow during the plowing tall weeds and stubble which under normal conditions with the conventional plow are not completely turned under, and usually continue to stand in the field after plowing at various angles making the subsequent cultivating operations difficult and incomplete.

It is therefore the principal object of this invention to present an attachment which may be easily mounted on any conventional mold board plow and which will when properly mounted completely turn under any stubble or weeds up to eighteen inches in height.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a top plan view showing the weed and stubble turner of my invention mounted upon a plow.

Figure 2 is a front elevational view thereof.

Figure 3 is a vertical sectional view at line 3—3 of Figure 1; and

Figure 4 is a vertical sectional view at line 4—4 of Figure 2.

Referring now to the drawings in detail wherein like characters indicate like parts, I have illustrated the weed and stubble turner of my invention as mounted on a conventional mold board plow 2 having a shearing edge 4 and a curved draw bar 6.

A support 8 is formed with lower forks 10 in which is journaled the cutting disk 12 and the support 8 is secured to the draw bar 6 by the attaching plate 14 and bolts 16 therethrough.

A weed and stubble turner supporting rod 18 is formed with a collar 20 which is secured on a vertical pin 22 by the nuts 24, and the lower flattened portion of the pin is secured on the draw bar by U-bolt 26.

A brace bar 28 for the rear end of the rod 18 is formed with a collar 29 having a set screw 29' and the brace bar is secured by nuts 30 to the bracket 32 having a lower slot 33 through the bolt 34 provides attachment to the plow 2. The supporting bar is thus adapted to be fixedly connected at its ends to the plow in a manner whereby it will extend laterally over the plow.

The stubble and weed turner plate 36 is wide and is formed of sheet metal of suitable thickness and is provided with a bottom flange 38 and a rear curved weed and stubble folder 40. The front edge of the plate is turned forwardly and folded and rounded as at 42 to prevent snagging of the plate on standing stubble.

The yokes 44 are suitably attached as by welding to the rear of the plate and through openings in the yokes I have mounted pins 46 secured by nuts 47, and the upper collars 48 of the pins are mounted on the rod 18 and secured by set screws 50. The springs 52 between the yoke and the collar on each pin provide a resilient mounting for the plate on the rod. The construction prevents the plate from yielding toward the back of the plow, but permits it to yield vertically.

The braces 54 of flat construction are formed with collars 56 and secured on the rod 18 by set screws 56 and these braces are not attached to the plate 36 but stand behind the plate to afford additional bracing as may be required.

As the plow cuts the furrow and the sod slides up along the plow curve to be laid in inverted position along the furrow, the plate will turn down any standing stubble and weeds and such stubble will be prevented from sliding off the rear of the plate by the folder 40.

Having thus fully described my invention what I claim as new and desire to secure by Letters Patent is:

1. A weed and stubble turner for attachment to a plow including a supporting bar adapted to be secured at both ends to the plow and extended laterally thereover, a stubble-turning plate positioned vertically over the plow, and means connecting the end portions of the plate to the respective end portions of the supporting bar, said means being adapted to prevent yielding of the plate toward the back of the plow while yet resiliently permitting upward movement thereof.

2. A weed and stubble turner for attachment to a plow including a supporting bar adapted to be secured at both ends to the plow and extended laterally thereover, a stubble-turning plate positioned vertically over the plow, said plate including an elongated intermediate plane portion, a forwardly curved rear end, and a forwardly extended and folded front end, and means connecting the plate to the respective end portions of the supporting bar, said means being adapted to prevent yielding of the plate toward the back of the plow while yet resiliently permitting upward movement thereof.

GEORGE A. AUGHEY.

(References on following page)

REFERENCES CITED

The following references are of record in the file of this patent:

UNITED STATES PATENTS

| Number | Name | Date |
|---|---|---|
| 184,030 | Ballard | Nov. 7, 1876 |
| 189,087 | Dock | Apr. 3, 1877 |
| 253,395 | Kennedy | Feb. 7, 1882 |
| 1,686,177 | Rosekelly | Oct. 2, 1928 |

FOREIGN PATENTS

| Number | Country | Date |
|---|---|---|
| 780,560 | France | Feb. 4, 1935 |
| 283,622 | Germany | Apr. 21, 1915 |